April 17, 1951        A. D. WEIR        2,548,924
ROLL FILM PHOTOGRAPHIC CAMERA
Filed Aug. 21, 1948
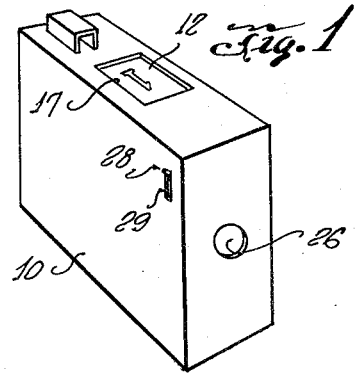
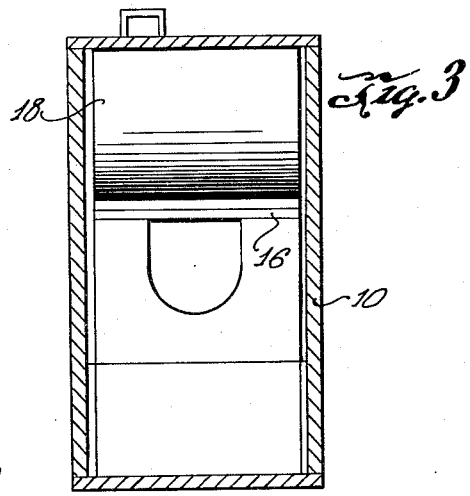
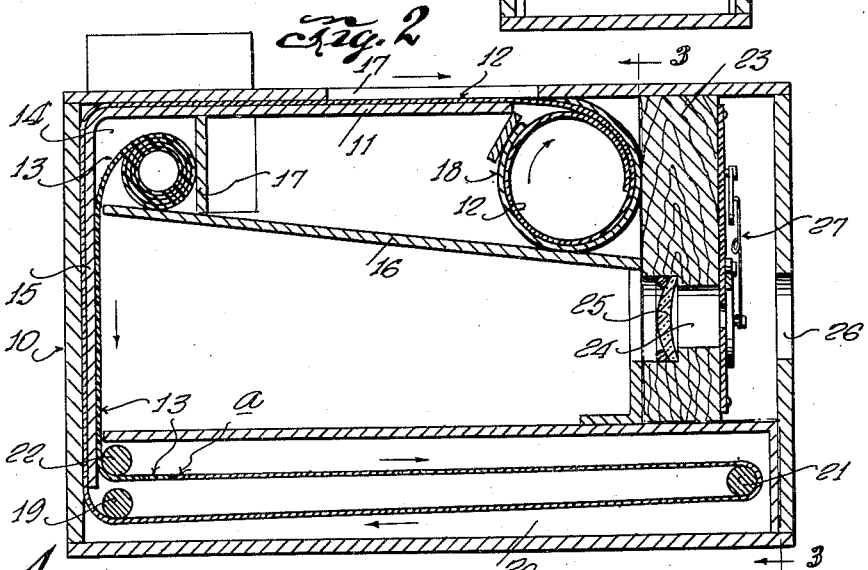
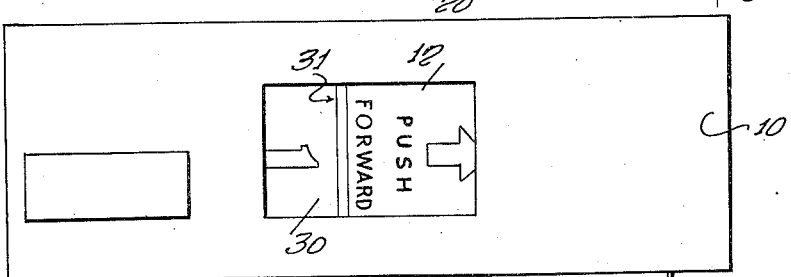
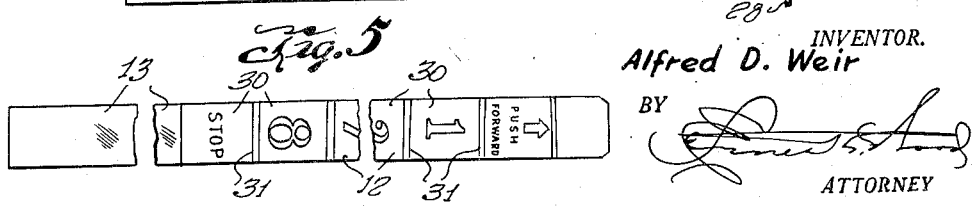
INVENTOR.
Alfred D. Weir
BY
ATTORNEY Patented Apr. 17, 1951

2,548,924

UNITED STATES PATENT OFFICE 2,548,924

ROLL FILM PHOTOGRAPHIC CAMERA

Alfred D. Weir, Dallas, Tex.

Application August 21, 1948, Serial No. 45,497

5 Claims. (Cl. 95—31)

This invention relates to cameras and more particularly to new and useful improvements in film moving means for roll film cameras.

The principal object of the invention is to provide a simplified camera structure which lends itself to the incorporation of a novel method of moving film past an exposure orifice, the same being accomplished without the aid of mechanical means. Moreover, through and by virtue of a film leader which is attached to the film to effect manual advancement thereof, positive registration of unexposed portions of the film with the exposure orifice is made possible by providing on the leader a plurality of consecutively numbered frames which are alignable with a window in the camera box and through which window a finger is inserted to engage and manually move the leader to advance the film.

Another object of the invention is to provide a camera of such simple and economical construction that it may be factory loaded and sealed and sold at a minimum of cost to and used by the purchaser who will return the camera to the factory for developing the exposed film, after which the pictures alone are returned to the purchaser. The design and construction of the camera is such that no focal or other adjustments are necessary on the part of the user who has but to make exposures and shift the film to align unexposed portions with the exposure orifice by manually moving the film leader through the window provided therefor.

With the foregoing objects in view, the invention has further reference to certain features of accomplishment which will become apparent as the description proceeds, taken in connection with the accompanying drawing wherein:

Figure 1 is a perspective view of a camera constructed according to the invention.

Figure 2 is a view in longitudinal section.

Figure 3 is a vertical sectional view taken on line 3—3 of Figure 2.

Figure 4 is a top plan view, and

Figure 5 is a detail view of the film and leader.

Continuing with a more detailed description of the drawing, reference numeral 10 denotes a box constructed preferably of inexpensive material, especially in cases where the camera is to be factory loaded and sealed and returned to the factory for developing of film exposed by the purchaser. The core of the camera may be built into the box with one wall of the latter removable for loading or, the core may be designed to be removed from the box for loading. In any case, the core consists of a top wall 11 so spaced from the top of the box 10 as to provide a passage through which is moved a leader 12. The top wall 11 further provides a light trap to shield unexposed film 13 in a storage chamber 14, the latter being defined by the rear wall 15 of the core, an inclined partition 16 and another partition 17 perpendicular to the top wall 11.

The top wall 11 of the core is disposed below a rectangular or square opening or window 17 in the top of the box 10, under which passes the film leader 12. The wall 11 serves as a backing for this leader when the finger or thumb is thrust against the leader to advance the same in the direction indicated by the arrow in Figure 4.

The leader 12 is coiled in a cylindrical chamber 18 in the core and extends through the passage defined by the top of box 10 and the wall 11 of the core and continues along the rear of the camera between the rear wall thereof and the wall 15 of the core. The leader then passes over a roller 19 in the lower elongated compartment 20 below the core, thence over a roller 21 in the forward end of compartment 20 and is cemented at $a$ to one end of the film 13, which latter passes over a roller 22 above the roller 19 in compartment 20. It is to be observed that the film 13 is at all times shielded from light as it is advanced by the leader from the storage chamber 14, across the area of the rear wall 15 of the core where it is exposed and thence into the chamber 20 for exposed portions of the film.

The fore part of the core consists of a block 23 having a lens orifice 24 containing a lens 25 which is aligned with an exposure orifice 26 in the front wall of the box 10. A shutter and shutter operating mechanism 27 is mounted on the front face of block 23 and is actuated by a lever 28 (Figure 1) extending through a slot 29 in one side of the box 10.

In Figure 5 especially, it will be observed that the leader 12 is divided into sections 30 by transverse lines 31, each section being identical in length to the length of the window 17 in the top of the camera. The sections 30 are consecutively numbered and as the sections are brought into view in the window 17 by engaging the leader with a finger or thumb, they are aligned with the window by the transverse lines 31. When in alignment, the operator will know that the portion of the film 13 then overlying the rear wall 15 of the core will constitute the next succeeding unexposed area thereof and after actuating the shutter, the leader is again engaged through window 17 to bring into register therewith the next section 30 and so on until the last numbered section or that identified with the word "stop" appears in the window.

The box 10 containing the fully exposed film may be returned to the factory where the film is removed in a darkroom, developed and the pictures alone forwarded to the sender of the camera. The camera may then be reloaded and resold.

It is to be understood that basically, the invention anticipates the feature of advancing film in a camera by employing a film leader attached to the film in such manner that the leader may be exposed for manual movement while shielding the film from light. Other features of the described camera may be altered or changed as desired. Also, the camera may be equipped with a rewinding key, if desired, by which daylight loading cylinders may be used in a conventional manner while retaining the foregoing method of manually moving the film.

Manifestly, the construction as shown and described is capable of some modification and such modification as may be construed to fall within the scope and meaning of the appended claims is also considered to be within the spirit and intent of the invention.

What is claimed is:

1. In a camera, a box having an exposure orifice, and a window in its top, a core in said box having a wall in parallel juxtaposition with the top of said box, defining a light trap and a narrow passage, a photographic film storage chamber therein containing film, a film leader connected to said film at one end and slidable in said passage to move film from said storage chamber past the exposure orifice of said camera, a storage chamber within the box in which said film leader is rolled by thrusts of the finger through said window, said parallel wall providing a backing for said film leader, means on said leader registerable through said window to predeterminately dispose selective sections of said film in relation to the exposure orifice of said camera and means for storing the exposed portion of said film.

2. In a camera, a box having an exposure orifice, and a window in a wall thereof and further provided with a storage chamber therein containing photographic film, a core in said box having a wall in spaced parallelism with the wall of said box containing said window and defining a film passage and a support for said film, a film leader attached to said photographic film and slidable in said passage by finger pressure thereon through said window against said support to move said film from said storage magazine past the exposure orifice of said camera, a chamber within the box in which said film leader is rolled as it emerges from said passage, means on said leader registerable through said window to predetermine selective portions of the position of unexposed film in relation to said exposure orifice and means for storing exposed film.

3. A camera comprising a box sealed against light infiltration and having a storage chamber therein containing unexposed film, said box further having an exposure orifice, and a window therein, a film leader confined wholly in said box and attached to said film and adapted to be longitudinally advanced by pressure exerted thereon by the finger inserted through said window, means providing a backing for the pressure exerted on said leader, means on said leader registerable through said window to bring selective sections of unexposed film into register with the exposure orifice of said camera, means within the box into which said film leader is deposited as it is passed under said window and means for storing exposed film.

4. In a roll film camera, a box having an exposure orifice in one end and an elongated window in the top thereof, a film moving means comprising a core in said box having a wall in juxtaposition to the top of said camera providing a film backing and defining a passage and a light trap, a slidable film leader confined by said passage having equi-distantly spaced and numbered frames alignable with the window in the top of said box to expose a portion of said leader, supported on said film backing for engagement and advancement by a finger of the hand, a photographic film attached at one end to an end of said leader and adapted to be moved thereby past the exposure orifice of said camera from an unexposed film storage compartment within the box into an exposed film compartment within the box of said camera.

5. In a roll film camera, a box having an exposure orifice and a window in the top thereof, a core in said box having a wall in spaced parallelism with the top of said box to provide a backing for film, and defining a film passage, a film storage chamber within the box containing photographic film, a film leader confined in said passage and attached at one end to an end of said film and adapted to be longitudinally displaced in said passage by finger engagement therewith through said window, a chamber within the box in which said leader is rolled in its passage under said window, means on said leader for alignment with said window to predetermine alignment of selective portions of unexposed film with the exposure orifice of said camera and means for receiving and storing the exposed portion of said film.

ALFRED D. WEIR.

REFERENCES CITED

The following references are of record in the file of this patent:

UNITED STATES PATENTS

| Number | Name | Date |
|---|---|---|
| 1,245,760 | Moxon | Nov. 6, 1917 |
| 1,595,997 | Cocanari | Aug. 17, 1926 |
| 1,857,524 | Wood | May 10, 1932 |
| 2,336,278 | Mihalyi | Dec. 7, 1943 |

FOREIGN PATENTS

| Number | Country | Date |
|---|---|---|
| 265,218 | Great Britain | July 14, 1927 |
| 782,157 | France | Mar. 11, 1935 |